United States Patent
Cook

(10) Patent No.: US 10,154,147 B2
(45) Date of Patent: *Dec. 11, 2018

(54) MULTI-NETWORK ACCESS GATEWAY

(71) Applicant: CenturyLink Intellectual Property LLC, Denver, CO (US)

(72) Inventor: Charles I. Cook, Louisville, CO (US)

(73) Assignee: CenturyLink Intellectual Property LLC, Broomfield, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/915,340

(22) Filed: Mar. 8, 2018

(65) Prior Publication Data

US 2018/0198922 A1 Jul. 12, 2018

Related U.S. Application Data

(63) Continuation of application No. 14/586,279, filed on Dec. 30, 2014, now Pat. No. 9,942,413.

(60) Provisional application No. 61/974,376, filed on Apr. 2, 2014.

(51) Int. Cl.
*H04M 7/12* (2006.01)
*H04M 7/00* (2006.01)

(52) U.S. Cl.
CPC .......... *H04M 7/125* (2013.01); *H04M 7/0069* (2013.01); *H04Q 2213/13196* (2013.01)

(58) Field of Classification Search
CPC ............... H04M 7/0069; H04M 7/125; H04Q 2213/13196
USPC .................................................... 379/220.01
See application file for complete search history.

(56) References Cited

U.S. PATENT DOCUMENTS

| 6,011,637 | A  | 1/2000 | Pfeiffer |
| 6,611,198 | B1 | 8/2003 | Geiszler et al. |
| 6,711,135 | B1 | 3/2004 | Dziekan et al. |
| 6,782,080 | B2 | 8/2004 | Leivo et al. |
| 7,076,167 | B2 | 7/2006 | Kim |
| 7,528,844 | B2 | 5/2009 | Deschamp |

(Continued)

OTHER PUBLICATIONS

Reconfigurable optical add-drop mulitplexer, http://en.wikipedia.org/wiki/Reconfigurable_optical_add-drop_multiplexer, Printed Dec. 15, 2009, 1 page.

(Continued)

*Primary Examiner* — Harry S Hong
(74) *Attorney, Agent, or Firm* — Adsero IP

(57) ABSTRACT

Disclosed embodiments include a multi-network gateway system providing one or more third-party telecommunications service providers access to a third-party network interface across an otherwise proprietary access network maintained by a primary telecommunications service provider. Specifically, one embodiment includes an access network provided by a primary telecommunications service provider in communication with a multi-network access gateway. One subset of telecommunications information conveyed across the access network is provided to a customer of the primary telecommunications service provider. Another subset of telecommunications information conveyed across the access network is provided to a third-party network interface and to a third-party network, for the use of the third-party telecommunications service provider.

19 Claims, 8 Drawing Sheets

(56) References Cited

U.S. PATENT DOCUMENTS

| | | |
|---|---|---|
| 7,609,967 B2 | 10/2009 | Hochbaum et al. |
| 7,794,157 B2 | 9/2010 | Hudgins |
| 7,889,670 B2 | 2/2011 | Casey et al. |
| 7,899,032 B1 | 3/2011 | Afshar et al. |
| 8,024,752 B2 | 9/2011 | Duffield |
| 8,346,095 B2 | 1/2013 | McNaughton et al. |
| 8,391,278 B2 | 3/2013 | Preis et al. |
| 8,655,174 B2 | 2/2014 | Zhu |
| 8,849,108 B2 | 9/2014 | Pradzynski |
| 9,236,944 B2 | 1/2016 | McNaughton et al. |
| 9,942,413 B2 * | 4/2018 | Cook .................. H04M 7/125 |
| 2002/0052915 A1 | 5/2002 | Amin-Salehi |
| 2003/0128987 A1 | 7/2003 | Mayer |
| 2004/0033075 A1 | 2/2004 | Koch |
| 2004/0039807 A1 | 2/2004 | Boveda De Miguel et al. |
| 2004/0141747 A1 | 7/2004 | Kenny et al. |
| 2005/0002396 A1 | 1/2005 | Gyetko |
| 2005/0129030 A1 | 6/2005 | Choi et al. |
| 2005/0138670 A1 | 6/2005 | Ploumen |
| 2005/0172329 A1 | 8/2005 | Kim et al. |
| 2006/0176835 A1 | 8/2006 | Jang et al. |
| 2008/0019693 A1 | 1/2008 | Sorin |
| 2009/0047016 A1 | 2/2009 | Bernard et al. |
| 2009/0110392 A1 | 4/2009 | Walid |
| 2009/0154924 A1 | 6/2009 | Liu |
| 2009/0154925 A1 | 6/2009 | Chen |
| 2009/0162063 A1 | 6/2009 | Mizutani et al. |
| 2009/0185804 A1 | 7/2009 | Kai et al. |
| 2010/0054740 A1 | 3/2010 | Lee et al. |
| 2010/0180000 A1 | 7/2010 | Cacheria et al. |
| 2010/0269146 A1 | 10/2010 | Britt |
| 2010/0290782 A1 | 11/2010 | Lee |
| 2010/0322626 A1 | 12/2010 | Kim et al. |
| 2011/0038629 A1 | 2/2011 | Johansson et al. |
| 2011/0058657 A1 | 3/2011 | Alegret et al. |
| 2011/0072475 A1 | 3/2011 | McKiel, Jr. |
| 2011/0135074 A1 | 6/2011 | McNaughton et al. |
| 2011/0167268 A1 | 7/2011 | Baykal |
| 2011/0317995 A1 | 12/2011 | Zheng |
| 2012/0005133 A1 | 1/2012 | Patel |
| 2012/0163374 A1 | 6/2012 | Shah |
| 2012/0288278 A1 | 11/2012 | Chen |
| 2012/0315040 A1 | 12/2012 | Dahlfort |
| 2013/0016974 A1 | 1/2013 | Zheng |
| 2013/0089188 A1 | 4/2013 | McNaughton et al. |
| 2015/0288825 A1 * | 10/2015 | Cook .................. H04M 7/0069 379/220.01 |
| 2016/0094901 A1 | 3/2016 | McNaughton et al. |

OTHER PUBLICATIONS

What is ROADM (reconfigurable optical add-drop multiplexer)?, Search Telecom.com Definitions, ROADM, http://searchtelecom.techtarget.com/sDefinition; Jan. 6, 2010, 2 pages.

* cited by examiner

MULTI-NETWORK ACCESS GATEWAY

CROSS REFERENCE TO RELATED APPLICATIONS

This application is a continuation application of U.S. patent application Ser. No. 14/586,279, filed Dec. 30, 2014 by Charles I. Cook, entitled, "Multi-Network Access Gateway," which claims priority to U.S. Patent Application Ser. No. 61/974,376, filed Apr. 2, 2014 by Charles I. Cook, entitled, "Multi-Network Access Gateway." The entire teachings of which are incorporated herein by reference in its entirety for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to apparatus, systems and methods for providing a third-party telecommunications service provider with access to a third-party network through an access network and through a multi-network access gateway provided by a primary telecommunications service provider.

BACKGROUND

Modern telecommunications services include, but are not limited to traditional voice telecommunications, video, audio video, data and other signals or content. Telecommunication services are provided to customers through various networks. For example, as shown in FIG. 1, telecommunications content might in certain instances be provided from a content provider 102 to a customer located at premises 104 through several networks of greater or lesser scale. The networks between the content provider 202 and premises 204 include but are not limited to access and core networks associated with the content provider (not shown), the Internet 106, a core network 108 and an access network 110. The access network 110 typically extends to a customer premises from an edge router. The access network 110 is maintained and owned by a primary telecommunications provider. The customer at premises 104 typically has a customer/vendor relationship with the primary telecommunications service provider who owns the access network 110.

Many telecommunications service providers simultaneously utilize larger backbone networks such as the Internet 106 and core network 108. However, a provider access network 110 extending to a gateway maintained by the customer (for example residential gateway 112) from an edge router maintained by a telecommunications service provider is proprietary to the telecommunications service provider. For example, an optical fiber, wire network, fixed wireless or other type of network utilizing one or more types of transmission media maintained by a telephone service provider from an edge router to a customer premises constitutes an access network which is not available for the transmission of telecommunications information provided by the local cable company or a wireless service provider. These other service providers must provide their own access networks if telecommunications services are to be provided to the customer at premises 104.

Therefore, multiple sets of equipment, cabling and hardware are required if multiple telecommunication service providers desire to provide and maintain an access network from an edge router to a customer premises. Hence, there is a need for solutions that can overcome the above and other technical hurdles to enable multiple telecommunications service providers to utilize the same access network to deliver content to a customer premises for customer use or further distribution in a third-party network.

BRIEF SUMMARY

Various embodiments include systems and techniques for providing a third-party telecommunications service provider with access to a third-party network through an access network and through a multi-network access gateway provided by a primary telecommunications service provider.

The tools provided by various embodiments include, without limitation, methods, systems, and/or software products. Merely by way of example, a method might comprise one or more procedures, any or all of which are executed by a computer system. Correspondingly, an embodiment might provide a computer system configured with instructions to perform one or more procedures in accordance with methods provided by various other embodiments. Similarly, a computer program might comprise a set of instructions that are executable by a computer system (and/or a processor therein) to perform such operations. In many cases, such software programs are encoded on physical, tangible, and/or non-transitory computer readable media (such as, to name but a few examples, optical media, magnetic media, and/or the like).

Disclosed embodiments include a multi-network gateway system providing one or more third-party telecommunications service providers access to a third-party network interface across an otherwise proprietary access network maintained by a primary telecommunications service provider. Specifically, one embodiment includes an access network provided by a primary telecommunications service provider in communication with a multi-network access gateway. The multi-network access gateway provides for the processing of telecommunications information conveyed to or from the access network.

In particular, a customer interface associated with the multi-network access gateway provides for the conveyance of a first subset of telecommunications information to one or more customer devices or networks. Also, at least one third-party interface associated with the multi-network access gateway provides for the conveyance of a second subset of the telecommunications information from the multi-network access gateway to a third-party network interface. The second subset of telecommunications information is communicated by a third-party telecommunications service provider to the third-party network interface across the access network owned or maintained by the primary telecommunications service provider. In certain embodiments, the second subset of telecommunications information may also be communicated across other network(s) owned or maintained by the primary telecommunications service provider. For example, in certain instances, it is possible that the third-party service provider may be located such that the second subset of telecommunications information is communicated across a core network or an ultra-long haul network that is owned and maintained by the primary service provider. Thus, the third-party service provider does not necessarily connect directly to the primary service provider's access network. In these embodiments, the third-party service provider can connect indirectly to the primary service provider's access network through other networks. The third-party portion of the telecommunications information may be utilized as required in a third-party network, for example a wireless network, DLEC, WAN and the like.

Thus, the disclosed embodiments address problems associated with third-party telecommunications service provider penetration to locations where the third-party provider has not previously built or maintained a local access network. In many instances it would be cost prohibitive for the third-party provider to place optical fiber or cable and power to remote access nodes at a given location because the coverage area of the desired third-party network (for example a small cell or femto cell) does not cost justify the infrastructure expense.

The multi-network access gateway and associated systems described herein enable a third-party telecommunications service provider to utilize the access network maintained by a primary telecommunications service provider to carry data to a third-party network interface as noted above. The telecommunication services provided to the third-party network interface through the multi-network access gateway can be any type of telecommunications services which are suitable for distribution over an access network and then further distributed or utilized as required by a given technology platform at the third-party network.

Multi-network gateway system embodiments may further include apparatus and infrastructure for powering a third-party network interface or third-party network. For example power may be connected from a power tap at a customer premises to the multi-network access gateway and distributed from the gateway to a third-party network interface or third-party network. Power usage at each component of the system may be monitored and controlled so that power costs can be apportioned between the customer, primary telecommunications service provider and any third-party telecommunications service providers utilizing the multi-network gateway system.

Access to a third-party network interface or third-party network across the access network maintained by the primary telecommunications service provider may be controlled or provisioned in any manner. For example, access may be granted and controlled in the field from a physical third-party network interface box. Alternatively, access to be granted and controlled remotely, for example using a software defined radio (SDR) associated with the third-party network interface under the control of an SDR base station operated by the primary telecommunications service provider. In certain embodiments, the functionality described above as being present at a physical third-party network interface box may be split with a portion of the functionality existing at a physical interface box and another portion existing at a virtual "cloud" interface or elsewhere in a network. In other embodiments, the third-party network interface may be virtualized using Network Function Virtualization (NFV) or other technologies.

Alternative embodiments include multi-network access gateways and third-party network interface devices. Other alternative embodiments include methods of granting one or more third-party telecommunications service providers access to a third-party network interface and third-party network across an access network owned or maintained by a primary telecommunications service provider.

Various modifications and additions can be made to the embodiments discussed without departing from the scope of the invention. For example, while the embodiments described above refer to particular features, the scope of this invention also includes embodiments having different combination of features and embodiments that do not include all of the above described features.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF CERTAIN EMBODIMENTS

Figure 1:
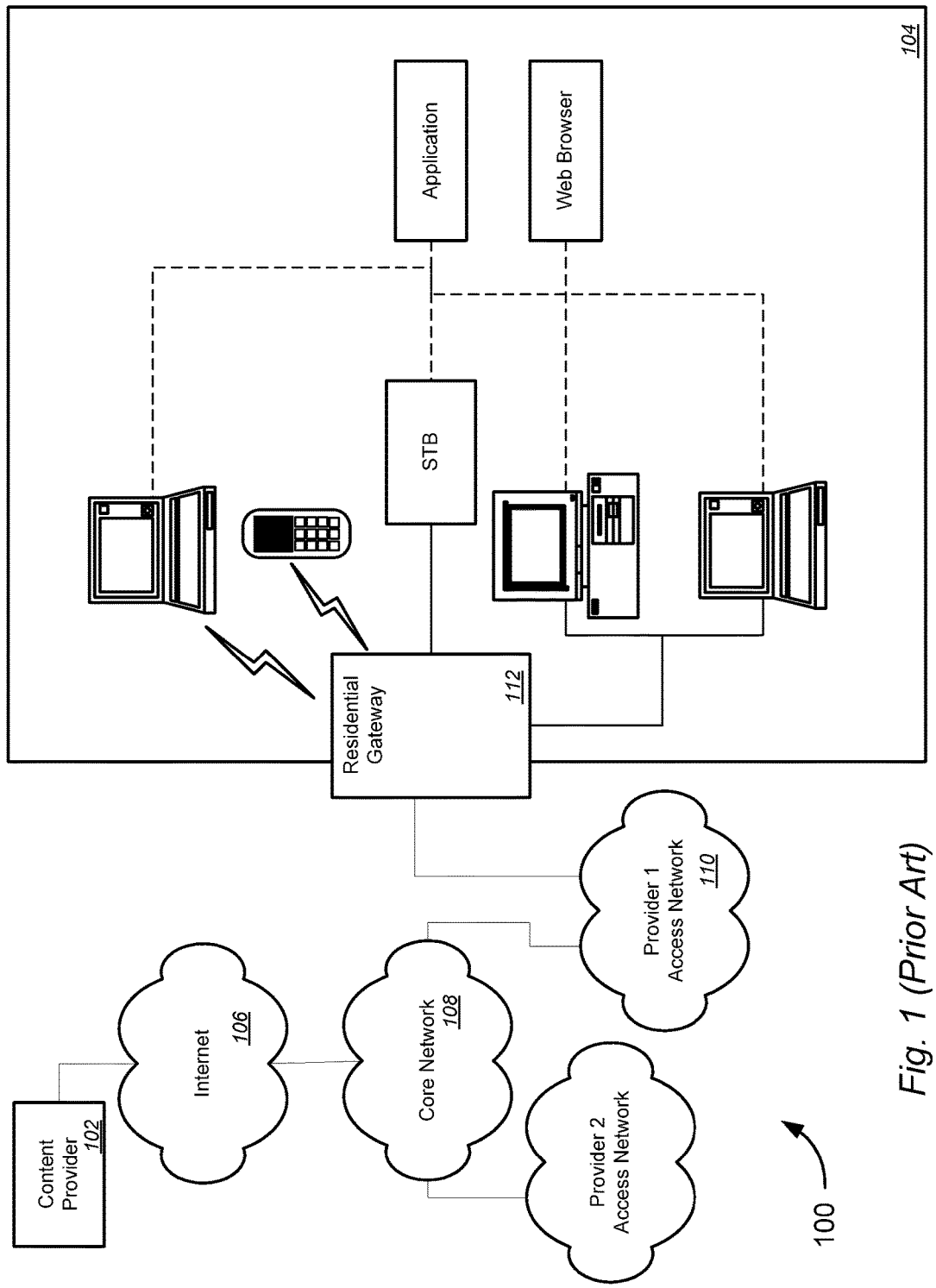
FIG. 1 is a block diagram illustration of certain prior art networks between a content provider and a customer.

Certain embodiments of the present invention are directed to devices that can be used to provide telecommunication services, as well as to methods and systems of using such devices. A network gateway can be any device capable of serving as an interface between networks, for example a residential gateway is capable of serving as an interface between a customer's networks and a telecommunication service provider's network. Gateways can be provided in greater or lesser complexity. Such devices can include, merely by way of example, set top boxes (which can be used, inter alia, as an interface between a customer's video appliance and a provider's video network), broadband modems (including xDSL modems, cable modems and wireless modems, each of which can be used to provide video and/or data to a customer premises), integrated access devices (which can, for instance, translate between Voice over IP ("VoIP") signals and traditional telephone signals, thus allowing traditional telephones to connect to a VoIP network), devices compatible with the session initiation protocol ("SIP") familiar to those skilled in the art, and/or the like.

In certain aspects, a network gateway is also a demarcation device which can be used to separate received telecommunication information into discrete sets, and optionally to process certain of those sets independently from other sets and/or transmit different sets to different locations, perhaps through the use of different ports for interfaces.

As used herein, references to the term "telecommunication information" should be interpreted to include any information that can be transmitted or carried by a telecommunication service provider's network (e.g., the Public Switched Telephone Network or "PSTN") or by any other telecommunication network, including but not limited to the Internet. Such information includes, for example, voice signals (e.g., Plain Old Telephone Service or "POTS," as the term is known to those skilled in the art), audio and video signals (encoded in any standard and/or proprietary, digital and/or analog format now known or hereafter developed, using any of a variety of means known to those skilled in the art, such as HDTV, NTSC and PAL formatting, as well as, for example, any of the MPEG digital encoding and/or compression algorithms), and data. Such data can be formatted according any of a variety of protocols familiar in the art, including in particular any of the protocols known in the art as part of the TCP/IP suite, in particular the Internet Protocol ("IP"). Data can also include infrastructural protocols, including, for instance, routing protocols and protocols necessary to implement advanced networking schemes known to those skilled in the art, such as multiprotocol label switching ("MPLS") or Border Gateway Protocol ("BGP") to name but two.

In this document, the term "telecommunication service provider" can mean any entity that provides telecommunication service to a customer's premises, including, merely by way of example, incumbent local exchange carriers, competitive local exchange carriers, cable television carriers, and satellite providers, to name a few. In contrast, the term "telecommunication information provider," means any entity that is capable of serving as a source of telecommunication information. In many cases, a particular entity may be considered both a telecommunication service provider and a telecommunication information provider, for instance, when a local exchange carrier provides Internet service to a customer, as well as the external transport medium attached to that customer's premises. In other cases, the two may be separate entities. For instance, according to certain embodiments of the invention, a cable television provider could contract with a local exchange carrier to provide broadcast television signals to a customer premises using the local exchange carrier's network and/or an external transport medium operated by the local exchange carrier.

The term "telecommunication information set" is used to describe a discrete subset of the telecommunication information transmitted across a particular transport medium and/or received at a gateway. Generally, the telecommunication information that is classified part of a particular information set shares a common characteristic. Merely by way of example, an information set can comprise telecommunication information of a particular type (e.g., voice, IP data, encoded video, and such), information associated with a particular application (e.g., information assigned to a specific IP port, as is known in the art, or information used by a particular software and/or hardware program), information addressed to or received from a particular device or network segment, information received within a particular reception window, and the like.

In certain embodiments, the described devices or systems can support the one-way flow of telecommunication information. In other embodiments, however, described devices or systems can support bidirectional flow of telecommunication information. For example, an xDSL modem allows the transmission of data both to and from a customer premises. In still other embodiments, a disclosed device can be configured to support both unidirectional and bidirectional information flows simultaneously, depending on the type of telecommunication information transmitted or the source of the information.

The described devices and systems can function in part to connect a primary telecommunications service provider's access network to customer devices or a customer-maintained network at the customer premises. As used herein, a primary telecommunications service provider is the service provider who (a) owns or has the right to use and access network and (b) typically has a contractual relationship with the customer to whom services are provided over the access network.

In addition, the described systems and methods can function to provide a third-party telecommunications service provider with access to a third-party network across the traditionally proprietary access network maintained by the primary telecommunications service provider. As used herein a third-party telecommunications service provider is one who utilizes the access network (or other networks) owned or maintained by the primary telecommunications service provider as described in detail below. As used herein, a proprietary network is one owned or maintained by the primary telecommunications service provider and may utilize either (or both of) standards based technology or non-standards based technology. In certain embodiments, the third-party telecommunications service provider may also utilize other network(s) owned or maintained by the primary telecommunications service provider. For example, in certain instances, the third-party service provider may be located such that information is communicated from the third-party service provider across a core network or an ultra-long haul network that is owned and maintained by the primary service provider. Thus, in certain embodiments, the third-party service provider does not necessarily connect directly to the primary service provider's access network. In these embodiments, the third-party service provider can connect indirectly to the primary service provider's access network through other networks.

The primary service provider's access network can be thought of as an "external transport medium," while customer network maintained at a customer premises or elsewhere in communication with the access network can be termed an "internal transport medium." Both external transport media and internal transport media are types of "transport media," a term used in this document to describe any cable, wire, fiber or other medium capable of carrying telecommunication information, including, but not limited to, twisted pair copper wiring (shielded or unshielded, including, for example, unshielded cables complying with industry-standard categories 3, 5, 5e and 6 and shielded cables commonly known as Token Ring™ cables, to name a few), optical fiber (including both single-mode and multimode fiber, as well as doped fiber, wavelength-division multiplexed, coarse wavelength-division multiplexed, wide wavelength-division multiplexed, dense wavelength-division and ultra-dense wavelength-division multiplexed fiber) and coaxial cable.

Other examples of transport media can also include universal serial bus ("USB") cable, cable complying with the Institute of Electrical and Electronics Engineers' ("IEEE") 1394 standard, as well as any medium capable of complying with the many local area networking standards known in the art. Of course, a transport medium need not be a physical medium; it can also comprise any of a wide variety of wireless transmissions, including (but not limited to) infra-red transmissions, radio frequency ("RF") transmissions, and transmissions complying with standards developed by any of the IEEE's working groups governing wireless communication (e.g., the 802.11, 802.15, 802.16, 802.20 and 802.22 working groups). Similarly, a transport medium can comprise other wireless technologies, such as point-to-point microwave, including local multipoint distribution system ("LMDS"), microwave multipoint distribution system and/or multipoint multi-channel distribution system (collectively, "MMDS") transmissions, and satellite, cellular/PCS, and/or ultra wideband transmissions, to name a few.

Figure 2:
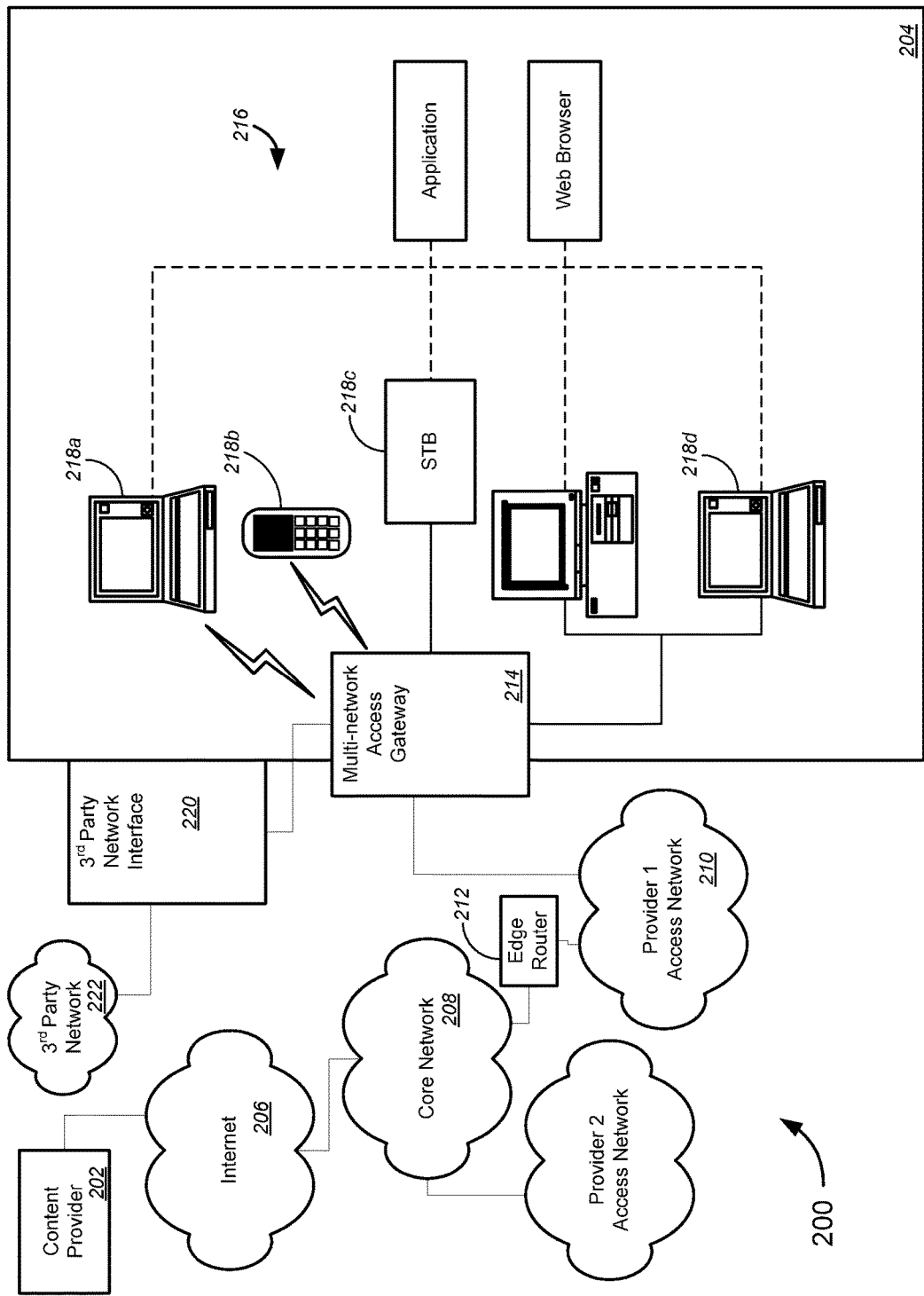
FIG. 2 is a block diagram illustration of a network environment consistent with certain disclosed embodiments.

FIG. 2 illustrates a system 200 that can provide telecommunication services consistent with the embodiments disclosed herein. For example, as shown in FIG. 2, telecommunications content might be provided from a content provider 202 to a customer located at premises 204 through several networks of greater or lesser scale. The networks between the content provider 202 and premises 204 include but are not limited to access and core networks associated with the content provider (not shown), the Internet 206, a core network 208 and an access network 210. The access network 210 typically extends to the customer premises 204 from an edge router 212 which is maintained and owned by a primary telecommunications provider. The customer at premises 204 typically has a customer/vendor relationship with the primary telecommunications service provider who owns or maintains the access network 210 and edge router 212.

Many telecommunications service providers simultaneously maintain and utilize larger backbone networks such as the Internet 206 and core network 208 in accordance with applicable FCC rules and regulations. However, a provider access network 210 extending to a customer gateway of one type or another (for example multi-network access gateway 214) from an edge router 212 maintained by a primary telecommunications service provider is proprietary to the primary telecommunications service provider. For example, optical fiber or a wire-based network hardware and cabling maintained by a telephone service provider from an edge router to a customer premises constitutes an access network which is not available for the transmission of telecommunications information provided by the local cable television company or a wireless service provider. These other service providers must provide their own access networks if telecommunications services are to be provided to the customer at premises 104, or if a third-party network is to be utilized by the third-party telecommunications service provider through an access network 210 owned by a different service provider.

The system 200 includes a multi-network access gateway 214. In some cases, as illustrated by FIG. 2, the multi-network access gateway 214 can in certain embodiments be implemented as a residential gateway. A multi-network access gateway 214 can be any device that provides at least the following two functions: (a) connectivity between a customer and a primary telecommunications service provider's access network, and (b) connectivity between one or more third-party telecommunications service providers and one or more third-party networks, with said third-party connectivity being provided across the primary telecommunications service provider's access network. Multi-network access gateways 214 can include, without limitation, network interface devices ("NID"), broadband modems, voiceband modems, cellular modems, wireless modems and access points, routers, other interfaces between the customer's premises network and the access network, and/or the like. Typically, the multi-network access gateway 214 will be located at the customer's premises, but this is not required in all embodiments.

As noted above, one function of a multi-network access gateway 214 is to provide connectivity between a customer network 216 or customer devices (for example devices 218a-218d) and an access network 210 operated by an primary telecommunications service provider, such as a broadband provider. Accordingly, in a typical implementation, the multi-network access gateway 214 will have a primary network interface (e.g., a broadband interface or an uplink interface) that communicates with the access network 210 using whatever technology is employed (e.g., xDSL, DOCSIS, wireless broadband, GPON etc.). The multi-network access gateway 214 will also include one or more customer facing ports or communication interfaces that provide connectivity with one or more customer devices (e.g., an Ethernet port, 802.11x radio, etc.). In some embodiments, the multi-network access gateway 214 might include router functionality, such that the customer port might provide for communication with a plurality of devices in the customer network 216 via either wired or wireless connection. In other embodiments, the multi-network access gateway 214 might provide a single customer interface, and/or local router functionality might be implemented by a separate device. The nature of the customer's network 216 and the devices 218 maintained on the customer's network 216 are not material to the scope of various embodiments disclosed herein.

In other cases, the multi-network access gateway 214 might be located away from a customer premises 204 at a device (not shown on FIG. 2) positioned within the access network 210. Alternatively, the multi-network access gateway might be configured to communicate with a separate customer residential gateway or network interface device on the customer premises network. The multi-network access gateway 214, in different embodiments, can be located at any location (or integrated with any device) that provides the multi-network access gateway 214 with a connection to the primary telecommunications service provider's access network 210, as described herein. Thus, in some cases, the multi-network access gateway 214 can be in a device separate from the access network 210, so long as it can communicate with appropriate devices in the access network 210 and provides a third-party network interface 220 as described below.

The multi-network access gateway 214 also includes or is associated with one or more third-party interfaces or ports providing for the bidirectional conveyance of telecommunications information from the multi-network access gateway 214 to one or more third-party network interfaces 220. A third-party network interface 220 provides a third-party telecommunications service provider with access to a third-party network 222 of any type as described in more detail below. In all embodiments however, the multi-network access gateway 214 provides the third-party telecommunications service provider access to the third-party network interface 220 through the proprietary access network 210 maintained by the primary telecommunications service provider.

Figure 3:
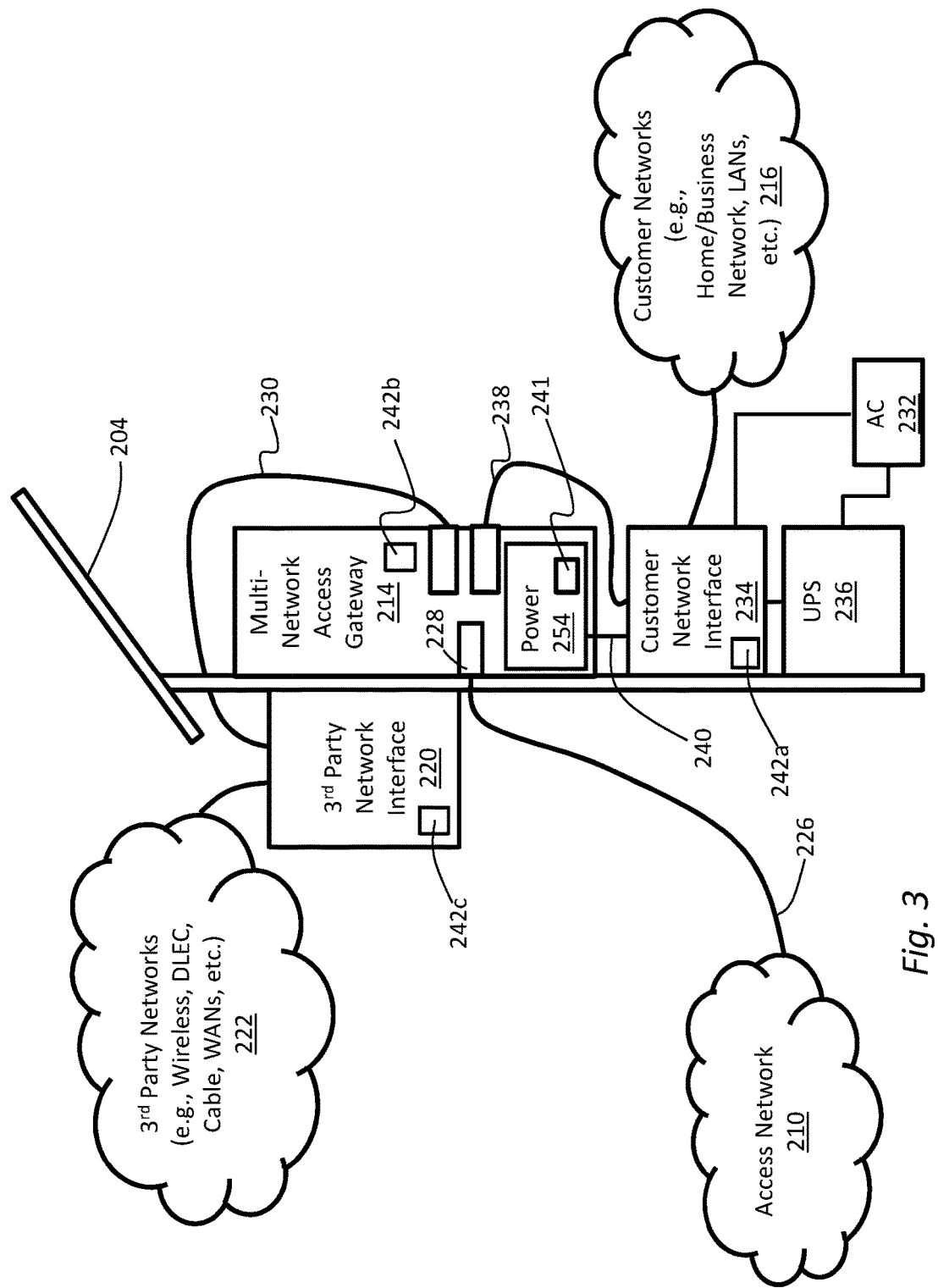
FIG. 3 is a schematic diagram showing a multi-network access gateway and associated equipment consistent with certain disclosed embodiments.
Figure 4:
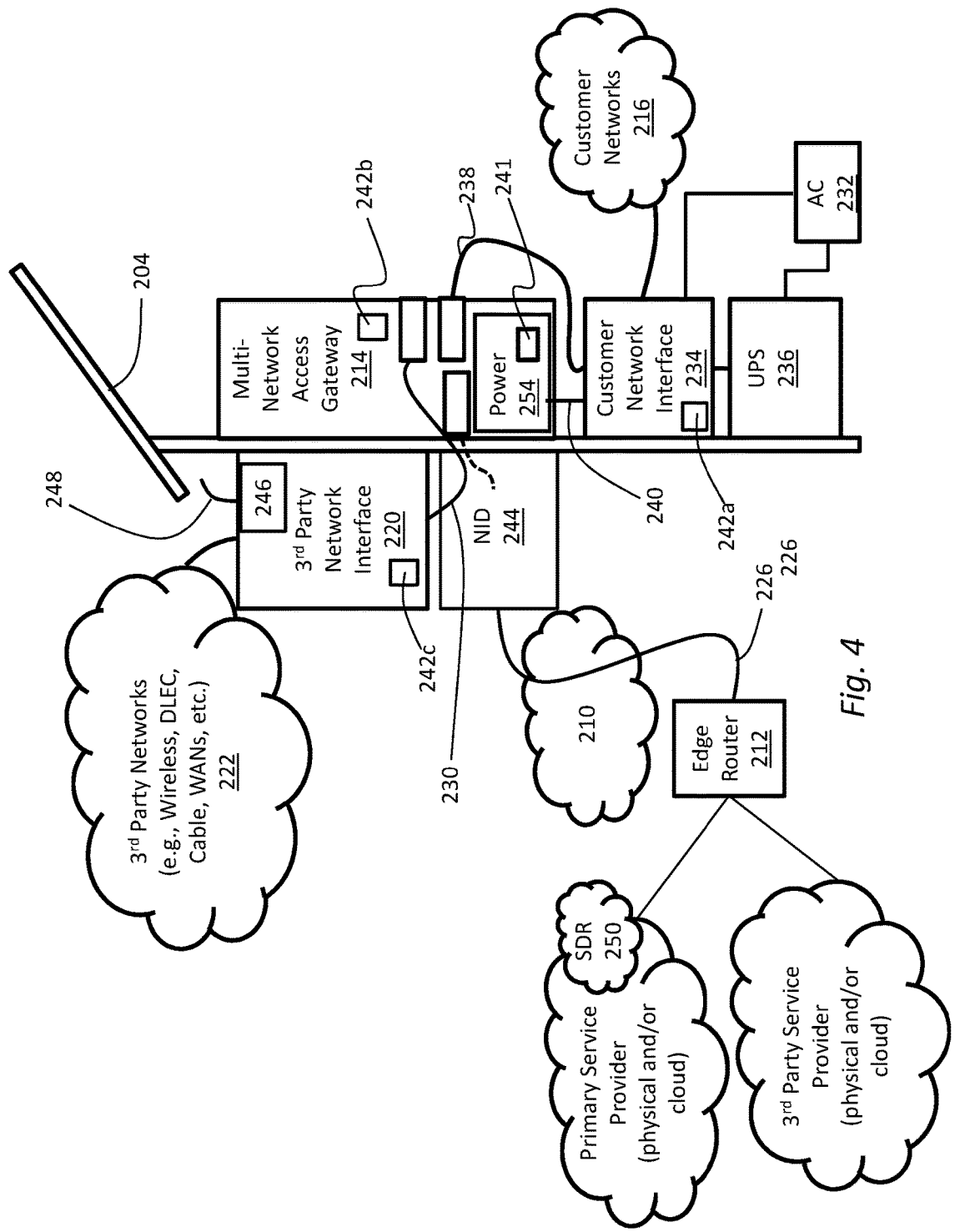
FIG. 4 is a schematic diagram showing an alternative multi-network access gateway configuration and associated equipment consistent with certain disclosed embodiments.

A more detailed schematic representation of selected non-limiting embodiments of system 200 is included in FIGS. 3-4. In particular, FIG. 3-4 show a multi-network access gateway 214 in communication with a primary telecommunications service provider's proprietary access network 210 over an external transport medium 226. As noted above, the external transport medium 226 may be any type of medium suitable for conveying a telecommunications signal including but not limited to various types of wire, cable, optical fiber, radio frequency signals, IR signals and the like. The external transport medium is received in an access network interface 228 at the multi-network access gateway 214.

A processor associated with the multi-network access gateway 214 processes the telecommunications signal received from the access network 210 into at least two components. The first component is a portion of the telecommunications signal intended for communication between the customer who owns or utilizes the residence or business 204 and the primary telecommunications service provider who maintains the access network 210. This portion of the signal communicated to the multi-network access gateway 214 is substantially the same as the telecommunications signals and information which are customarily communicated between a customer and their telecommunications/Internet service provider. In addition, a second portion of the telecommunications signal conveyed over the access network 210 to the multi-network access gateway 214 comprises signals provided by one or more third-party telecommunications service provider. The third-party portion of the telecommunications signal is separated at the multi-network access gateway 214 and communicated to the third-party network interface 220 over transport medium 230. The second portion of the telecommunications signal may be conveyed from the multi-network access gateway 214 to the third-party network interface 220 over any type of transport medium 230 as described above.

The first and second portions of the telecommunications signal received and processed at the multi-network access gateway 214 may be isolated using VLANs or similar techniques. Quality of service (QoS) control, rate shaping data policing, metering and other network maintenance techniques can be applied separately to each portion of the telecommunications signal.

From the third-party network interface 220, the third-party portion of the signal may be conveyed to or utilized by any type of third-party network 222 including but not limiting to a wireless network, data local exchange carrier (DLEC) cable network, wide area network (WAN) and the like. In one possible but nonlimiting example, the primary telecommunications service provider might be the regional telephone company. Voice, data and audiovisual services are provided to the customer in the conventional manner through the access network 210. The third-party telecommunications service provider in this example may be a wireless service provider who desires to add capacity to their networks using small cells or data offload nodes.

In many instances it would be cost prohibitive for the wireless service provider to place optical fiber or another transport medium and power to an access nodes located near the premises 204 because the small coverage area of the desired small cells does not cost justify the infrastructure expense. The multi-network access gateway 214 described herein would enable the wireless service provider to utilize the access network 210 maintained by the primary telecommunications service provider to carry data to a third-party network interface 220. Small cell wireless broadcast equipment located near the premises 204 would then obtain data (and in certain instances power as described below) through the third-party network interface 214. Thus, the third-party wireless service provider avoids the expense of placing optical fiber or another transport medium and power to a desired small cell location and the primary telecommunications service provider creates a bandwidth licensing opportunity. The telecommunication services provided to the third-party network interface 220 through the multi-network access gateway 214 can be any type of telecommunications services which are suitable for distribution over access network 210 and then further distributed or utilized as required by a given technology platform at the third-party network 222.

In the Figures, the multi-network access gateway 214 is illustrated as being physically located on an inside surface of the premises 204. This positioning is advantageous, but nonlimiting. Locating the access gateway 214 on an interior surface of the customer premises 204 permits the access gateway to be implemented with non-weather resistant housings thereby reducing cost compared to an alternative weather hardened embodiment positioned on the outside of the structure. On the contrary, the third-party network interface 220 is illustrated positioned on an exterior surface of the premises 204. This location is also nonlimiting, but advantageous, since an exterior location provides a technician associated with the third-party telecommunications service provider access to the third-party network interface 220 without requiring that the technician enter the premises 204.

Although an interior location for the multi-network access gateway 214 and an exterior location for the third-party network interface 220 can be advantageous as described above, both devices could be located on the interior surface of a premises, the exterior surface of the premises or away from a premises at another location in the access network 210. In some embodiments, portions of the multi-network access gateway 214 and third-party network interface 220, for example selected active electronic components, may be located within the interior of a premises while other components, for example antennas ports, junctions, sockets or other connecting elements may be located on the exterior of the premises. In addition, the multi-network access gateway 214 and third-party network interface 220 could be housed together as a unified device, or distributed over multiple hardware devices.

As noted above, the embodiments disclosed herein allow one or more third-party telecommunications service providers to avoid the cost of installing optical cable, wire or another transport medium to a distribution point co-located with the third-party network interface 220. A suitable power tap is another significant expense which would be incurred by the third-party telecommunications service provider upon building a separate access network to the location of the third-party network interface 220. In certain embodiments disclosed herein, power may be obtained from a power source already present at the premises 204 and apportioned as required between the customer, primary telecommunications service provider and third-party telecommunications service provider.

For example, as shown in FIG. 3, the customer premises 204 will typically have multiple taps connected to the AC power grid, represented in FIG. 3 by AC tap 232. AC power may be provided to customer maintained apparatus such as the customer network interface 234 or an uninterruptible power supply 236. As noted above, the customer network interface 234 receives and distributes telecommunications signals including but not limited to voice, data or audiovisual information from the primary telecommunications service provider through the multi-network access gateway 214 and across transport medium 238. The customer network interface 234 or another customer apparatus may include a power distribution line 240 extending to the multi-network access gateway 214 and/or third-party network interface 220. Thus power which is already located at the premises 204 may be utilized to power the multi-network access gateway 214 and third-party network interface 220 further facilitating third-party telecommunications services provider use of the access network 210 while reducing the need for additional costly infrastructure. Alternatively power and data can be distributed to or from the multi-network access gateway 214 utilizing a multipurpose power and data transport medium 230 or 238, for example a power over Ethernet (PoE) configuration or the like.

In certain embodiments, an uninterruptible power supply 236 can be connected in electrical communication with some or all of the customer network interface, 234, multi-network access gateway 214, third-party network interface 220 or other devices to provide power to same in the event of a failure in the AC power system.

In addition, the system 200 may include a power meter 241 with power sensors 242 in communication with the customer network interface, 234 multi-network access gateway 214, third-party network interface 220 or other devices to detect and record the power used by each device. The cost of power may then be apportioned as desired between the third-party telecommunications services provider, the primary telecommunications services provider and the owner of premises 204.

Additional system details present in some embodiments are illustrated on FIG. 4. In particular, the FIG. 4 embodiment includes a network interface device (NID) 244 at an exterior surface of the premises 204. A NID 244 is a demarcation point between access network 210 and any networks or devices owned or maintained by the owner of premises 204. Additional detail concerning NID technology and usage is included in the following U.S. patent applications: Ser. No. 14/261,226, filed on Apr. 24, 2014 by Charles I. Cook entitled "Antenna System and Methods for Wireless Optical Network Termination"; Ser. No. 13/965,830, filed Aug. 13, 2013 by Bruce A. Phillips et al. and entitled, "Multiple-Enclosure Residential Gateways", which is a continuation of U.S. patent application Ser. No. 10/356,338 (now U.S. Pat. No. 8,537,814), filed Jan. 31, 2003 by Bruce A. Phillips et al. and entitled, "Configurable Network Interface Device and Systems and Methods for Its Use", each of which applications are hereby incorporated by reference in their entirety for all matters disclosed therein.

As shown in FIG. 4, transport medium 230 conveying data and in certain embodiments power, from the multi-network access gateway 214 may extend to or through the NID 244, thereby providing exterior-premises programming or maintenance access to the multi-network access gateway 214 to a service technician associated with the primary telecommunications services provider even though the physical multi-network access gateway 214 is maintained inside the customer premises 204.

In some embodiments, programming, maintenance and/or control of the third-party network interface 220 may be accomplished using tools and ports physically located at the third-party network interface 220. In other embodiments, programming maintenance and/or control of the third-party network interface 220 may be accomplished remotely over the access network 210 and various transport media connecting the access network 210 to the third-party network interface 220. In another alternative embodiment, the third-party network interface 220 also includes a software defined radio (SDR) 246 and corresponding antenna 248. A SDR base station 250 is maintained by or provided to the primary telecommunications services provider and may be used to remotely control the third-party network interface 22 to accomplish tasks including but not limited to the provisioning of third-party network services for a third-party telecommunications service provider. Other tasks which may be provided directly or using an SDR base station include but are not limited to providing small cell, femto cell, Wi-Fi or similar functionality to the third-party service provider to extend their own service networks.

In certain alternative embodiments, the functions described herein as occurring at a third-party network interface 220 may be wholly or in part virtualized using Network Function Virtualization (NFV) or a similar technology. In particular, NFV can be utilized to virtualize some portions of the third-party interface 220 to allow splitting the functionality of the third-party interface device 220 into a virtual portion centralized in the "cloud" to facilitate common management. The use of NFV or a similar technology beneficially may simplify the third-party interface 220 at the customer's premises 204 for cost reduction, and facilitate the introduction of new functionality or capacity to the third-party interface device 220 via Network Virtualized Functions. In other embodiments, a third-party interface 220 may be implemented using both NFV and SDR technologies to meet control, provisioning and updating requirements.

Figure 5:
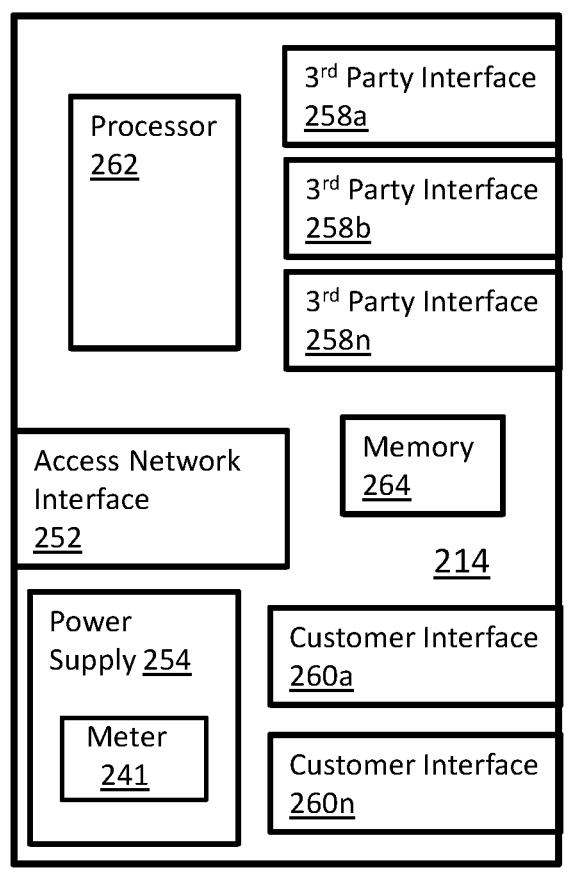
FIG. 5 is a block diagram illustration of a multi-network access gateway consistent with certain disclosed embodiments.

FIG. 5 is a more detailed schematic representation of one embodiment of multi-network access gateway 214. The multi-network access gateway 214 includes one or potentially more access network interfaces 252 which provide a port for telecommunications information communication between the multi-network access gateway 214 and the access network 210 maintained by the primary telecommunications services provider. As noted above, one or more other devices, for example a NID 244, may be positioned between the multi-network access gateway 214 and the access network 210.

The multi-network access gateway 214 also includes a power supply 254 which may be associated with a power meter or power metering logic 241. As noted above, the multi-network access gateway 214 may receive power from a customer-maintain device, for example the customer network interface 234 or a customer maintained uninterruptible power supply 236. Power may be distributed from the multi-network access gateway 214 to other devices including but not limited to the third-party network interface 220. Power may be distributed to or from multi-network access gateway 214 over dedicated power lines (i.e. power distribution line 2400, or over transport media, for example transport media at 230, 238 or others. If present in a given embodiment, the power meter 241 or power metering logic can receive data from power sensors associated with various devices to provide for the apportionment of power used between the owner of the premises 204, the primary telecommunications services provider and one or more third-party telecommunications service providers.

The multi-network access gateway 214 also includes one or potentially several third-party interfaces 258a, 258b . . . 258n which provide an interface or port from the multi-network access gateway 214 to one or more third-party network interfaces 220 utilized by one or more third party telecommunications service providers. Similarly, the multi-network access gateway 214 includes one or more customer interfaces 260a . . . 260n providing for the conveyance of telecommunications information from the multi-network access gateway 214 to a customer network interface 234 or one or more customer devices 218. Any of the above ports or interfaces could be implemented with any suitable interface technology including but not limited to Ethernet, xDSL, or the like. The interface may be configured to transmit optical or electrical signals. Ports may be provisioned to support several different networks.

In addition, the multi-network access gateway 214 includes one or more processors 262 the processor(s) 262 may operate according to software stored in memory 264 or otherwise process instructions to perform various tasks including but not limited to separation of an incoming telecommunications signal into one or more subsets of signals for communication between the customer and the primary telecommunications service provider and one or more subsets of signals for communication to third-party network interfaces 220. Thus, the processor controls input and output from the access network interface 252, any third-party interface 258 and any customer interface 260. The processor may further control power distribution through the power supply 254 and/or power metering at the power meter and/or power metering logic 241.

Figure 6:
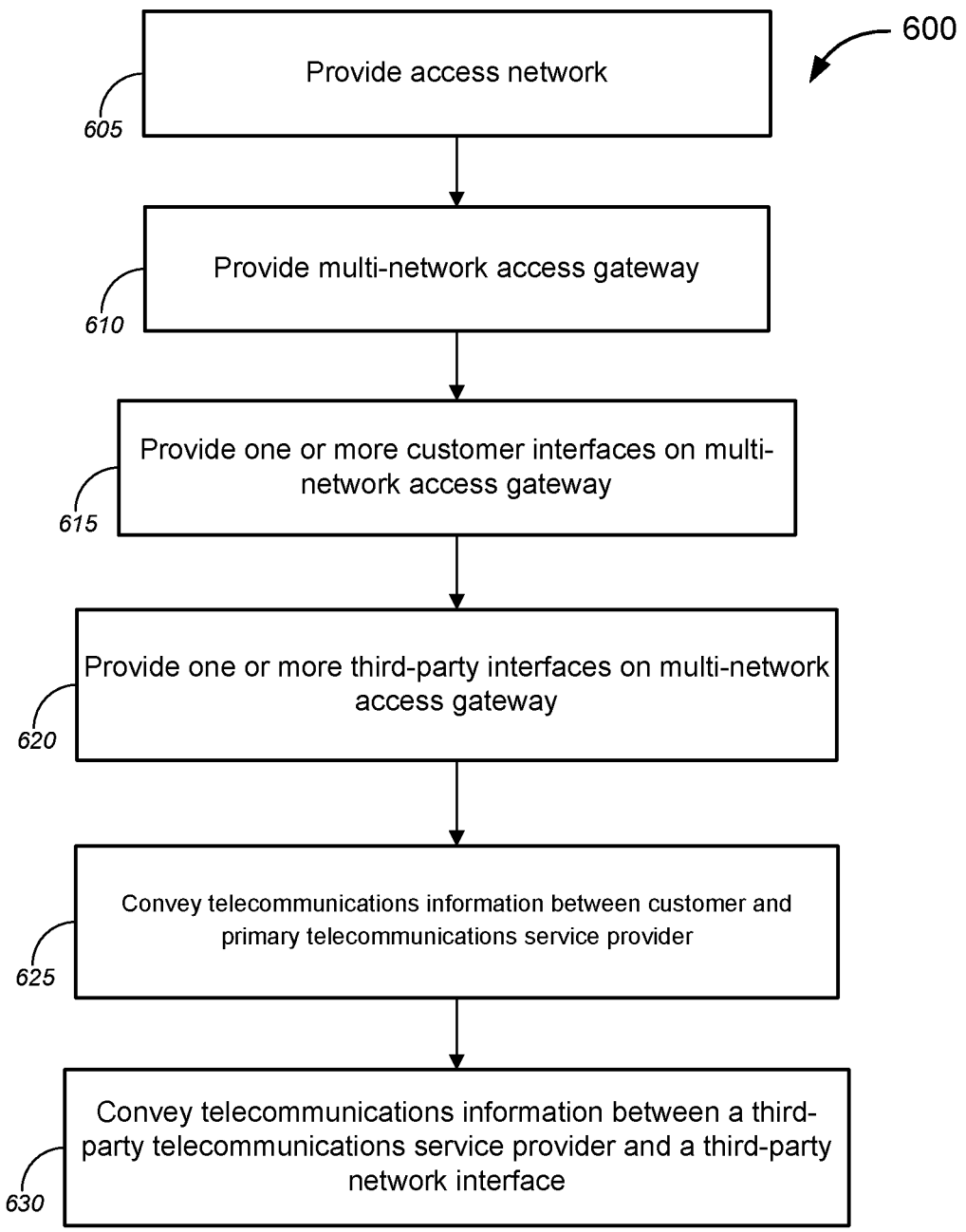
FIG. 6 is a flowchart representation of a selected method consistent with certain disclosed embodiments.

Alternative embodiments include methods of providing network access to a third-party telecommunications service provider. One representative method 600 is illustrated in the flowchart of FIG. 6. This representative method includes the steps of providing an external transport medium in communication with an access network (Step 605). In addition a multi-network access gateway is provided in communication with the access network (Step 610). The method further includes providing one or more customer interfaces and providing one or more third-party interfaces, in association with the multi-access network gateway (Steps 615 and 620). A first subset of telecommunications information may be bidirectionally conveyed through a customer interface between a primary telecommunications service provider and a customer (Step 625). In addition, a second subset of telecommunications information may be bidirectionally conveyed through a third-party interface between a third-party network interface and a third party telecommunication service provider (Step 630).

In alternative method embodiments, power may be monitored and the cost for power may be apportioned as described above. Method embodiments are not limited to any particular device mounting location. For example, the multi-network access gateway, third-party network interface, customer network interface or other apparatus may be mounted on the exterior of a customer premises, in the interior of the customer premises away from a customer premises but in association with an access network or otherwise.

Certain method embodiments provide the control and programming of a multi-network access gateway to provision network usage for one or more third-party telecommunications service providers. In some embodiments, control is provided through SDR communications between an SDR associated with one or more third-party network interfaces and a base SDR maintained by the primary telecommunications service provider.

Although a limited number of networks are shown in FIGS. 2, 3 and 4, the various embodiments are not so limited, and any suitable number of ISP or content provider networks and corresponding customers (and customer devices and customer networks) may be supported. The various embodiments allow application of the methods described herein to any suitable number of customers (and customer devices and customer networks) ranging from 1 to N, where N is any appropriate number of customers that any service provider can technically connect to the service provider's network. In some cases, any theoretical maximum limit for N may increase with time as technology advances.

Figure 7:
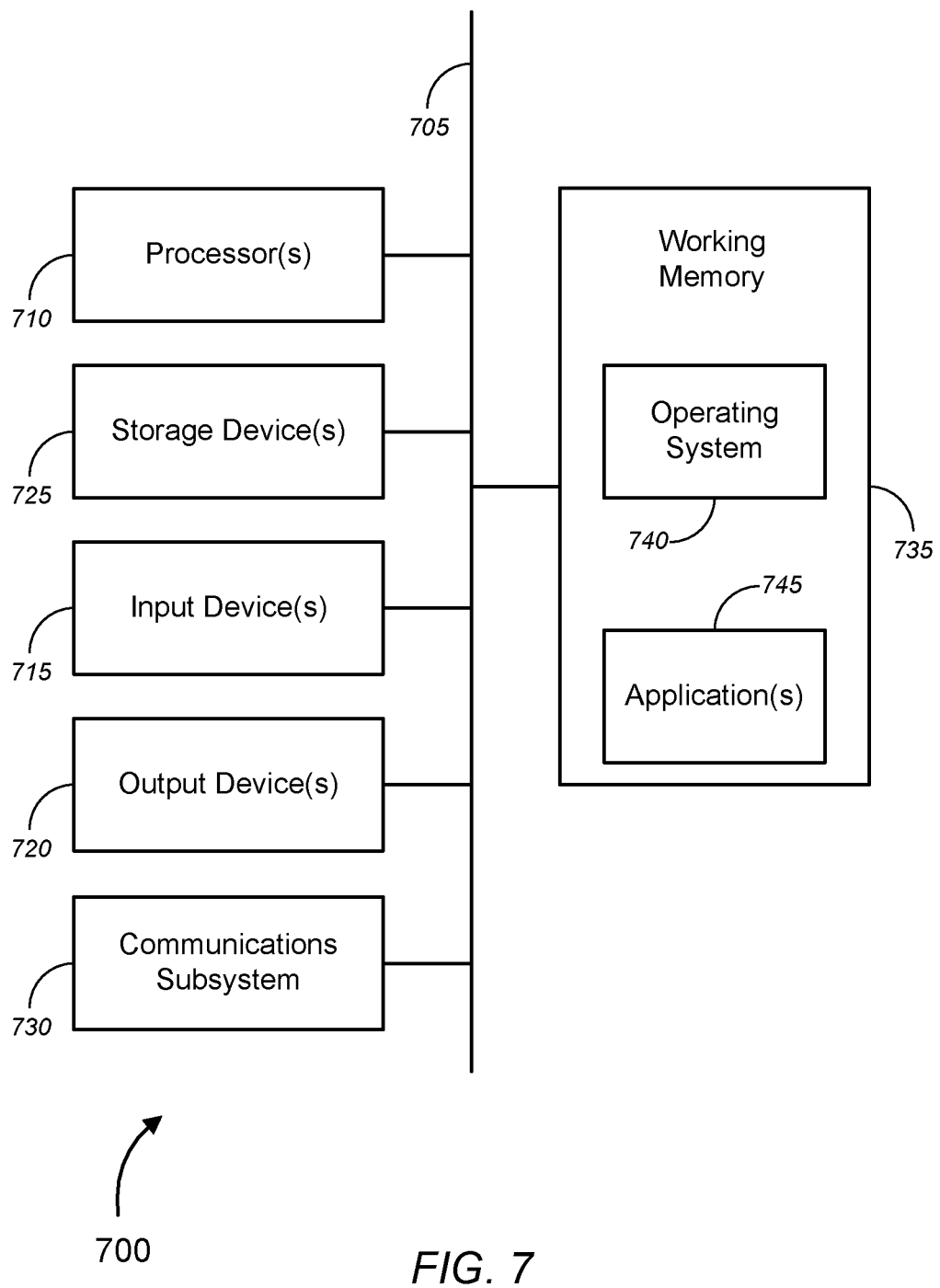
FIG. 7 is a generalized schematic diagram illustrating a computer system, in accordance with various embodiments.
Figure 8:
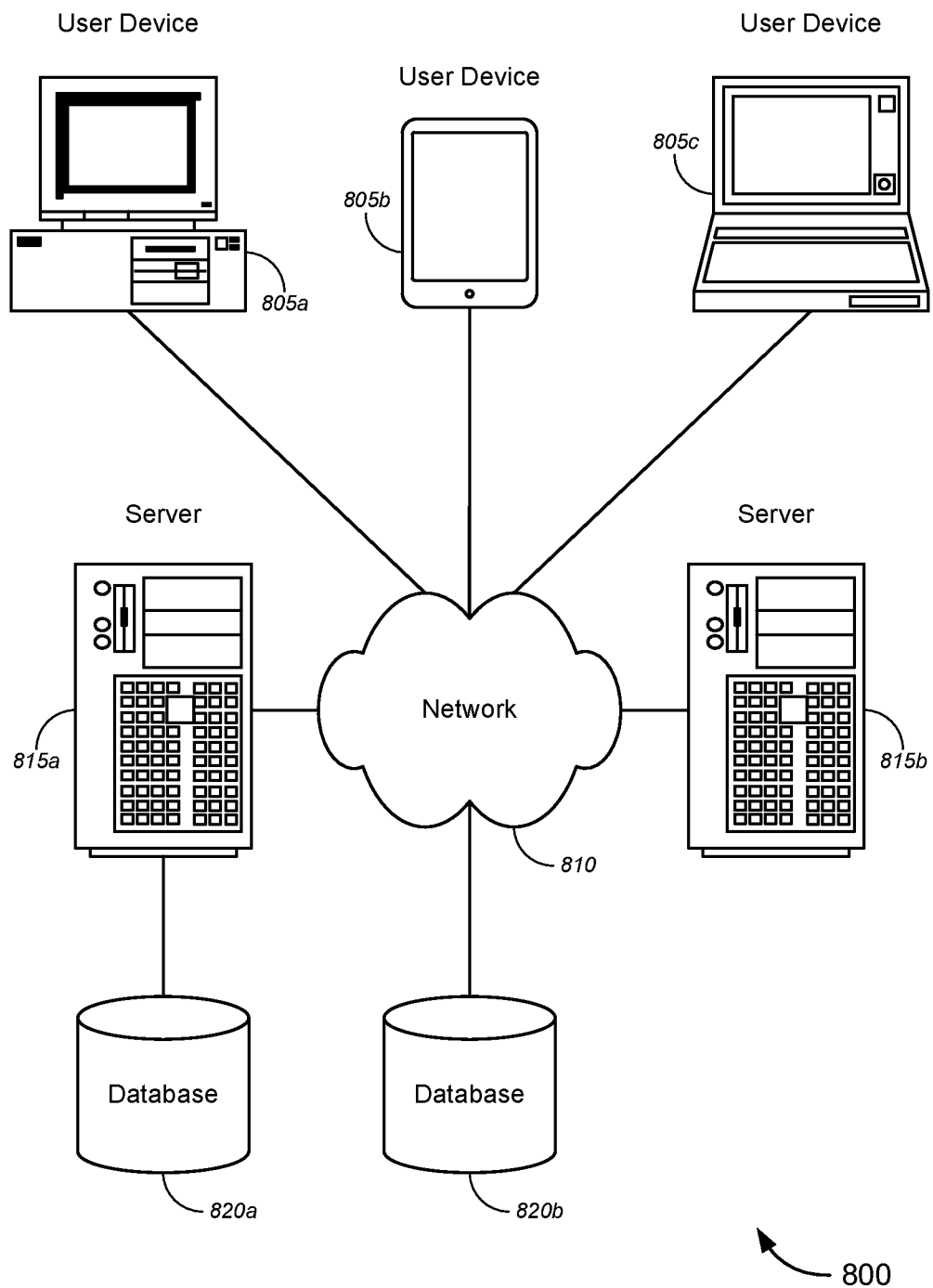
FIG. 8 is a generalized schematic diagram illustrating a network in accordance with various embodiments.

We now turn to FIG. 7, which is a block diagram illustrating an exemplary computer architecture. FIG. 7 provides a schematic illustration of one embodiment of a computer system 700 that can perform the methods provided by various other embodiments, as described herein, and/or can perform the functions of local or user computer system 130, website performance tracking servers 140, 160 or other computer systems as described above. It should be noted that FIG. 6 is meant only to provide a generalized illustration of various components, of which one or more, or none, of each may be utilized as appropriate. FIG. 6, therefore, broadly illustrates how individual system elements may be implemented in a relatively separated or relatively more integrated manner.

The computer system 700 is shown comprising hardware elements that can be electrically coupled via a bus 705, or may otherwise be in communication, as appropriate. The hardware elements may include one or more processors 710, including without limitation one or more general-purpose processors, or one or more special-purpose processors such as digital signal processing chips, graphics acceleration processors, or the like; one or more input devices 715, which can include without limitation a mouse, a keyboard, or the like; and one or more output devices 720, which can include without limitation a display device, a printer, or the like.

The computer system 700 may further include, or be in communication with, one or more storage devices 725. The one or more storage devices 725 can comprise, without limitation, local and/or network accessible storage, or can include, without limitation, a disk drive, a drive array, an optical storage device, a solid-state storage device. The solid-state storage device can include, but is not limited to, one or more of a random access memory ("RAM") or a read-only memory ("ROM"), which can be programmable, flash-updateable, or the like. Such storage devices may be configured to implement any appropriate data stores, including without limitation various file systems, database structures, or the like.

The computer system 700 might also include a communications subsystem 730, which can include without limitation a modem, a network card (wireless or wired), an infra-red communication device, a wireless communication device or chipset, or the like. The wireless communication device might include, but is not limited to, a Bluetooth™ device, an 802.11 device, a WiFi device, a WiMax device, a WWAN device, cellular communication facilities, or the like.

The communications subsystem 730 may permit data to be exchanged with a network (such as network 125, 145 or 155 to name examples), with other computer systems, with any other devices described herein, or with any combination of network, systems, and devices. According to some embodiments, network 125 (as well as network 145, 155 and 165) might include a local area network ("LAN"), including without limitation a fiber network, an Ethernet network, a Token-Ring™ network, and the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including without limitation a network operating under any of the IEEE 802.11 suite of protocols, the Bluetooth™ protocol, or any other wireless protocol; or any combination of these or other networks. In many embodiments, the computer system 700 will further comprise a working memory 735, which can include a RAM or ROM device, as described above.

The computer system 700 may also comprise software elements, shown as being currently located within the working memory 735, including an operating system 740, device drivers, executable libraries, or other code. The software elements may include one or more application programs 745, which may comprise computer programs provided by various embodiments, or may be designed to implement methods and/or configure systems provided by other embodiments, as described herein. Merely by way of example, one or more procedures described with respect to the methods discussed above might be implemented as code or instructions executable by a computer or by a processor within a computer. In an aspect, such code or instructions can be used to configure or adapt a general purpose computer, or other device, to perform one or more operations in accordance with the described methods.

A set of these instructions or code might be encoded and/or stored on a non-transitory computer readable storage medium, such as the storage devices 725 described above. In some cases, the storage medium might be incorporated within a computer system, such as the system 700. In other embodiments, the storage medium might be separate from a computer system—that is, a removable medium, such as a compact disc, or the like. In some embodiments, the storage medium might be provided in an installation package, such that the storage medium can be used to program, configure, and/or adapt a general purpose computer with the instructions/code stored thereon. These instructions might take the form of executable code, which is executable by the computer system 700, or might take the form of source or installable code. The source or installable code, upon compilation, installation, or both compilation and installation, on the computer system 700 might take the form of executable code. Compilation or installation might be performed using any of a variety of generally available compilers, installation programs, compression/decompression utilities, or the like.

It will be apparent to those skilled in the art that substantial variations may be made in accordance with specific requirements. For example, customized hardware—such as programmable logic controllers, field-programmable gate arrays, application-specific integrated circuits, or the like—might also be used. In some cases, particular elements might be implemented in hardware, software (including portable software, such as applets, etc.), or both. Further, connection to other computing devices such as network input/output devices may be employed.

As mentioned above, in one aspect, some embodiments may employ a computer system, such as the computer system 700, to perform methods in accordance with various embodiments of the invention. According to a set of embodiments, some or all of the procedures of such methods might be performed by the computer system 700 in response to processor 710 executing one or more sequences of one or more instructions. The one or more instructions might be incorporated into the operating system 740 or other code that may be contained in the working memory 735, such as an application program 745. Such instructions may be read into the working memory 735 from another computer readable medium, such as one or more of the storage devices 725. Merely by way of example, execution of the sequences of instructions contained in the working memory 735 might cause the one or more processors 710 to perform one or more procedures of the methods described herein.

The terms "machine readable medium" and "computer readable medium," as used herein, refer to any medium that participates in providing data that causes a machine to operate in a specific fashion. In an embodiment implemented using the computer system 700, various computer readable media might be involved in providing instructions or code to the one or more processors 710 for execution, might be used to store and/or carry such instructions/code such as signals, or both. In many implementations, a computer readable medium is a non-transitory, physical, or tangible storage medium. Such a medium may take many forms, including, but not limited to, non-volatile media, volatile media, and transmission media. Non-volatile media includes, for example, optical disks, magnetic disks, or both, such as the storage devices 725. Volatile media includes, without limitation, dynamic memory, such as the working memory 735. Transmission media includes, without limitation, coaxial cables, copper wire and fiber optics, including the wires that comprise the bus 705, as well as the various components of the communication subsystem 730, or the media by which the communications subsystem 730 provides communication with other devices. Hence, transmission media can also take the form of waves, including without limitation radio, acoustic, or light waves, such as those generated during radio-wave and infra-red data communications.

Common forms of physical or tangible computer readable media include, for example, a floppy disk, a flexible disk, a hard disk, magnetic tape, or any other magnetic medium; a CD-ROM, DVD-ROM, or any other optical medium; punch cards, paper tape, or any other physical medium with patterns of holes; a RAM, a PROM, an EPROM, a FLASH-EPROM, or any other memory chip or cartridge; a carrier wave; or any other medium from which a computer can read instructions or code.

As noted above, a set of embodiments comprises methods and systems for website performance tracking. FIG. 7 illustrates a schematic diagram of a system 800 that can be used in accordance with one set of embodiments. The system 800 can include one or more user computers or user devices 805. A user computer or user device 805 can be a general purpose personal computer (including, merely by way of example, desktop computers, tablet computers, laptop computers, handheld computers, and the like, running any appropriate operating system, several of which are available from vendors such as Apple, Microsoft Corp., and the like) and/or a workstation computer running any of a variety of commercially-available UNIX™ or UNIX-like operating systems. A user computer or user device 805 can also have any of a variety of applications, including one or more applications configured to perform methods provided by various embodiments (as described above, for example), as well as one or more office applications, database client and/or server applications, and/or web browser applications. Alternatively, a user computer or user device 805 can be any other electronic device, such as a thin-client computer, Internet-enabled mobile telephone, and/or personal digital assistant, capable of communicating via a network (e.g., the network 810 described below) and/or of displaying and navigating web pages or other types of electronic documents. Although the exemplary system 800 is shown with three user computers or user devices 805, any number of user computers or user devices can be supported.

Certain embodiments operate in a networked environment, which can include a network 810. The network 810 can be any type of network familiar to those skilled in the art that can support data communications using any of a variety of commercially-available (and/or free or proprietary) protocols, including without limitation TCP/IP, SNA™, IPX™, AppleTalk™, and the like. Merely by way of example, the network 810 can include a local area network ("LAN"), including without limitation a fiber network, an Ethernet network, a Token-Ring™ network and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including without limitation a network operating under any of the IEEE 802.11 suite of protocols, the Bluetooth™ protocol known in the art, and/or any other wireless protocol; and/or any combination of these and/or other networks. In a particular embodiment, the network might include an access network of the service provider (e.g., an Internet service provider ("ISP")). In another embodiment, the network might include a core network of the service provider, and/or the Internet.

Embodiments can also include one or more server computers 815. Each of the server computers 815 may be configured with an operating system, including without limitation any of those discussed above, as well as any commercially (or freely) available server operating systems. Each of the servers 815 may also be running one or more applications, which can be configured to provide services to one or more clients 805 and/or other servers 815.

Merely by way of example, one of the servers 815 might be a data server, as described above. The data server might include (or be in communication with) a web server, which can be used, merely by way of example, to process requests for web pages or other electronic documents from user computers 805. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 805 to perform methods of the invention.

The server computers 815, in some embodiments, might include one or more application servers, which can be configured with one or more applications accessible by a client running on one or more of the client computers 805 and/or other servers 815. Merely by way of example, the server(s) 815 can be one or more general purpose computers capable of executing programs or scripts in response to the user computers 805 and/or other servers 815, including without limitation web applications (which might, in some cases, be configured to perform methods provided by various embodiments). Merely by way of example, a web application can be implemented as one or more scripts or programs written in any suitable programming language, such as Java™, C, C#™ or C++, and/or any scripting language, such as Perl, Python, or TCL, as well as combinations of any programming and/or scripting languages. The application server(s) can also include database servers, including without limitation those commercially available from Oracle™, Microsoft™, Sybase™, IBM™ and the like, which can process requests from clients (including, depending on the configuration, dedicated database clients, API clients, web browsers, etc.) running on a user computer or user device 805 and/or another server 815. In some embodiments, an application server can perform one or more of the processes for implementing automated cloud expansion and ordering, or the like, as described in detail above. Data provided by an application server may be formatted as one or more web pages (comprising HTML, JavaScript, etc., for example) and/or may be forwarded to a user computer 805 via a web server (as described above, for example). Similarly, a web server might receive web page requests and/or input data from a user computer 805 and/or forward the web page requests and/or input data to an application server. In some cases a web server may be integrated with an application server.

In accordance with further embodiments, one or more servers 815 can function as a file server and/or can include one or more of the files (e.g., application code, data files, etc.) necessary to implement various disclosed methods, incorporated by an application running on a user computer 805 and/or another server 815. Alternatively, as those skilled in the art will appreciate, a file server can include all necessary files, allowing such an application to be invoked remotely by a user computer or user device 805 and/or server 815.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 820. The location of the database(s) 820 is discretionary: merely by way of example, a database 820a might reside on a storage medium local to (and/or resident in) a server 815a (and/or a user computer or user device 805). Alternatively, a database 820b can be remote from any or all of the computers 805, 815, so long as it can be in communication (e.g., via the network 810) with one or more of these. In a particular set of embodiments, a database 820 can reside in a storage-area network ("SAN") familiar to those skilled in the art. (Likewise, any necessary files for performing the functions attributed to the computers 805, 815 can be stored locally on the respective computer and/or remotely, as appropriate.) In one set of embodiments, the database 820 can be a relational database, such as an Oracle database, that is adapted to store, update, and retrieve data in response to SQL-formatted commands. The database might be controlled and/or maintained by a database server, as described above, for example.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A multi-network gateway system comprising:
   a proprietary access network controlled by a primary telecommunications service provider;
   a multi-network access gateway located at a customer premises, the multi-network access gateway being in communication with the proprietary access network such that the multi-network access gateway and proprietary access network provide a communications path for telecommunications information to be conveyed from the primary telecommunications service provider over the proprietary access network to the multi-network access gateway, wherein the telecommunications information comprises:
      a first subset of the telecommunications information, created by the primary telecommunications service provider; and
      a second subset of the telecommunications information created by a third-party telecommunications service provider and provided by the third-party telecommunications service provider to the primary telecommunications service provider for transmission over the proprietary access network to the multi-network access gateway;
   a customer interface associated with the multi-network access gateway providing for conveyance of the first subset of the telecommunications information from the multi-network access gateway to one or more customer devices at the customer premises; and
   a third-party network interface associated with the multi-network access gateway providing for conveyance of the second subset of the telecommunications information from the multi-network access gateway through the third-party network interface to a third-party network.

2. The multi-network gateway system of claim 1 wherein the multi-network access gateway is located on an interior surface of the customer premises and the third-party network interface is located on an exterior surface of the customer premises.

3. The multi-network gateway system of claim 1 further comprising:
   a customer network interface in communication with the customer interface of the multi-network access gateway;
   a power connection extending from the customer network interface to the multi-network access gateway; and
   a power connection extending from the multi-network access gateway to the third-party network interface providing for power to be supplied to the third-party network interface from the customer premises.

4. The multi-network gateway system of claim 3 further comprising a power meter in communication with the power connection extending from the customer network interface to the multi-network access gateway and the power connection extending from the multi-network access gateway to the third-party network interface, wherein the power meter collects power usage data for each of the customer network interface, the multi-network access gateway and the third-party network interface and thereby provides for the apportionment of power costs between the customer premises, the primary telecommunications service provider and the third-party telecommunications service provider.

5. The multi-network gateway system of claim 3 further comprising an uninterruptable power supply in electrical communication with the customer network interface, wherein the uninterruptible power supply provides power to the multi-network access gateway and the third-party network interface during the temporary absence of AC power to the customer network interface.

6. The multi-network gateway system of claim 1 wherein the multi-network access gateway comprises an optical network termination of the access network.

7. The multi-network gateway system of claim 1 wherein the third-party network interface further comprises a software defined radio and antenna system.

8. The multi-network gateway system of claim 7 wherein the software defined radio is deployed by the primary telecommunications service provider and programmed remotely by the primary telecommunications service provider to provide access to the third-party network.

9. A multi-network access gateway comprising:
   a housing located at a customer premises;
   a processor mounted within the housing, the processor providing for the processing of telecommunications information conveyed to the multi-network access gateway over a proprietary access network controlled by a primary telecommunications service provider, wherein the telecommunications information comprises:
      a first subset of the telecommunications information, created by the primary telecommunications service provider; and
      a second subset of the telecommunications information, created by a third-party telecommunications service provider and provided by the third-party telecommunications service provider to the primary telecommunications service provider for transmission over the proprietary access network to the multi-network access gateway;
   a customer interface providing for conveyance of the first subset of the telecommunications information from the multi-network access gateway to one or more customer devices at the customer premises; and
   a third-party network interface providing for conveyance of the second subset of the telecommunications information from the multi-network access gateway through the third-party network interface to a third-party network.

10. The multi-network access gateway of claim 9 further comprising:
    a power connection extending from the multi-network access gateway to a customer network interface; and
    a power connection extending from the multi-network access gateway to the third-party network interface such that power is supplied to the third-party network interface from the customer network interface.

11. The multi-network access gateway of claim 10 further comprising a power meter in communication with the power connection extending from the customer network interface to the multi-network access gateway and in communication with the power connection extending from the multi-network access gateway to the third-party network interface, wherein the power meter collects power usage data for each of the customer network interface, the multi-network access gateway and the third-party network interface and thereby provides for the apportionment of power costs between the customer premises, the primary telecommunications service provider and the third-party telecommunications service provider.

12. The multi-network access gateway of claim 9 wherein the multi-network access gateway comprises an optical network termination of the proprietary access network.

13. A method of providing network access comprising:
providing a proprietary access network controlled by a primary telecommunications service provider;
providing a multi-network access gateway at a customer premises, the multi-network access gateway being in communication with the proprietary access network such that the multi-network access gateway and proprietary access network provide a communications path for telecommunications information to be conveyed from the primary telecommunications service provider over the proprietary access network to the multi-network access gateway, wherein the telecommunications information comprises:
    a first subset of the telecommunications information, created by the primary telecommunications service provider; and
    a second subset of the telecommunications information created by a third-party telecommunications service provider and provided by the third-party telecommunications service provider to the primary telecommunications service provider for transmission over the proprietary access network to the multi-network access gateway;
providing a customer interface in association with in the multi-network access gateway;
providing a third-party interface in association with the multi-network access gateway;
conveying the first subset of the telecommunications information over the proprietary access network to the multi-network access gateway and through the customer interface to one or more customer devices at the customer premises; and
conveying the second subset of the telecommunications information over the proprietary access network to the multi-network access gateway and through the third-party network interface to a third-party network.

14. The method of claim 13 further comprising:
installing the multi-network access gateway on an interior surface of the customer premises; and
installing the third-party network interface on an exterior surface of the customer premises.

15. The method of claim 14 further comprising:
providing a power connection extending from a customer network interface to the multi-network access gateway;
providing a power connection extending from the multi-network access gateway to the third-party network interface; and
supplying power to the third-party network interface from the customer premises.

16. The method of claim 15 further comprising:
providing a power meter in communication with the power connection extending from the customer network interface to the multi-network access gateway and the power connection extending from the multi-network access gateway to the third-party network interface; and
collecting power usage data for each of the customer network interface, the multi-network access gateway and the third-party network interface; and
apportioning the power costs between the customer premises, the first telecommunications service provider and the third-party telecommunications service provider.

17. The method of claim 16 further comprising:
providing an uninterruptable power supply in electrical communication with the customer network interface; and
providing power to the multi-network access gateway and the third-party network interface through the uninterruptible power supply during the temporary absence of AC power to the customer network interface.

18. The method of claim 13 further comprising providing a multi-network access gateway comprising an optical network termination of the access network.

19. The method of claim 13 further comprising implementing the third-party network interface with a software defined radio and antenna system.

* * * * *